(12) United States Patent
Galula et al.

(10) Patent No.: US 11,165,851 B2
(45) Date of Patent: Nov. 2, 2021

(54) SYSTEM AND METHOD FOR PROVIDING SECURITY TO A COMMUNICATION NETWORK

(71) Applicant: Argus Cyber Security Ltd., Tel Aviv (IL)

(72) Inventors: Yaron Galula, Kadima (IL); Ofer Ben-Noon, Rishon-LeZion (IL); Oron Lavi, Kfar Saba (IL); Ofer Kapota, Rishon LeZion (IL); Alexei Kovelman, Raanana (IL)

(73) Assignee: Argus Cyber Security Ltd., Tel Aviv (IL)

( * ) Notice: Subject to any disclaimer, the term of this patent is extended or adjusted under 35 U.S.C. 154(b) by 82 days.

(21) Appl. No.: 15/196,094

(22) Filed: Jun. 29, 2016

(65) Prior Publication Data

US 2016/0381055 A1 Dec. 29, 2016

Related U.S. Application Data

(60) Provisional application No. 62/185,943, filed on Jun. 29, 2015.

(51) Int. Cl.
H04L 29/08 (2006.01)
H04L 29/06 (2006.01)

(52) U.S. Cl.
CPC ............ *H04L 67/10* (2013.01); *H04L 63/14* (2013.01); *H04L 63/1441* (2013.01); *H04L 67/12* (2013.01)

(58) Field of Classification Search
CPC .. H04W 4/026; H04M 1/72527; H04B 1/385; H04L 67/10; H04L 63/1441; H04L 63/14; H04L 67/12
See application file for complete search history.

(56) References Cited

U.S. PATENT DOCUMENTS

| | | | |
|---|---|---|---|
| 6,024,187 A | 2/2000 | Takeda et al. | |
| 6,236,365 B1 | 5/2001 | LeBlanc et al. | |
| 6,556,900 B1 | 4/2003 | Brynielsson | |
| 7,333,481 B1 * | 2/2008 | Rawat ................. | H04L 12/4641 370/352 |
| 9,288,048 B2 | 3/2016 | Han et al. | |
| 9,469,261 B1 | 10/2016 | Thomas et al. | |
| 9,560,071 B2 | 1/2017 | Ruvio et al. | |

(Continued)

FOREIGN PATENT DOCUMENTS

| | | |
|---|---|---|
| EP | 1128627 | 8/2001 |
| EP | 1309132 | 5/2003 |

OTHER PUBLICATIONS

Muter M. et al. "A structured approach to anomaly detection for in-vehicle networks," in Information Assurance and Security (IAS), 2010 Sixth International Conference on IEEE, 2010, pp. 92-98.

(Continued)

*Primary Examiner* — Meng Li
(74) *Attorney, Agent, or Firm* — Pearl Cohen Zedek Latzer Baratz LLP

(57) ABSTRACT

A system and method for providing security to a network may include identifying a message sent over a network, the message related to a data transfer from an initiator to a target node, and transmitting, over the network, at least one disruptive message that causes the data transfer to fail.

19 Claims, 4 Drawing Sheets

(56) References Cited

U.S. PATENT DOCUMENTS

| | | | |
|---|---|---|---|
| 9,792,435 | B2 | 10/2017 | Harris et al. |
| 9,843,594 | B1 | 12/2017 | Evans et al. |
| 10,187,406 | B2 | 1/2019 | Maeda et al. |
| 2002/0181405 | A1* | 12/2002 | Ying .................. H04W 24/00 370/245 |
| 2004/0073655 | A1 | 4/2004 | Kan et al. |
| 2006/0095174 | A1* | 5/2006 | Sonnenrein ............ B60R 16/02 701/31.5 |
| 2007/0052586 | A1 | 3/2007 | Horstemeyer |
| 2010/0256835 | A1 | 10/2010 | Mudalige |
| 2012/0304007 | A1 | 11/2012 | Hanks et al. |
| 2014/0032800 | A1 | 1/2014 | Peirce et al. |
| 2014/0067734 | A1 | 3/2014 | Hawkins et al. |
| 2014/0165191 | A1 | 6/2014 | Ahn et al. |
| 2014/0250531 | A1 | 9/2014 | Moeller et al. |
| 2014/0310530 | A1 | 10/2014 | Oguma et al. |
| 2015/0020152 | A1 | 1/2015 | Litichever et al. |
| 2015/0029987 | A1* | 1/2015 | Addepalli ............... H04Q 9/00 370/329 |
| 2015/0089236 | A1 | 3/2015 | Han et al. |
| 2015/0113638 | A1* | 4/2015 | Valasek ................ G06F 21/562 726/22 |
| 2015/0172306 | A1 | 6/2015 | Kim et al. |
| 2015/0222708 | A1 | 8/2015 | Addepalli et al. |
| 2015/0256276 | A1* | 9/2015 | Jones .................... H04H 60/65 455/3.01 |
| 2016/0028763 | A1 | 1/2016 | Cruz Mota et al. |
| 2016/0035148 | A1* | 2/2016 | Huang ................. H04L 9/0866 701/31.4 |
| 2016/0135038 | A1* | 5/2016 | Ochiai ................... B60R 25/01 370/338 |
| 2016/0173505 | A1 | 6/2016 | Ichihara |
| 2016/0188396 | A1 | 6/2016 | Sonalker et al. |
| 2016/0197932 | A1* | 7/2016 | Hoffman ............. H04L 63/1408 726/4 |
| 2016/0205194 | A1 | 7/2016 | Kishikawa et al. |
| 2016/0212162 | A1 | 7/2016 | Cain et al. |
| 2016/0297401 | A1 | 10/2016 | Haga et al. |
| 2016/0315958 | A1 | 10/2016 | Munetoh |
| 2016/0365822 | A1* | 12/2016 | Tanabe .................. H02P 29/02 |
| 2017/0093659 | A1 | 3/2017 | Elend et al. |
| 2018/0196941 | A1 | 7/2018 | Ruvio et al. |

OTHER PUBLICATIONS

European Office Action of EP Application No. 16 176 885.8 dated Dec. 4, 2017.
Office Action of U.S. Appl. No. 15/196,226 dated Sep. 29, 2017.
Final Office Action of U.S. Appl. No. 15/196,226 dated Mar. 13, 2018.
Extended European Search Report for EP Application No. 16176885 dated Oct. 7, 2016.
Office action of U.S. Appl. No. 15/196,252 dated May 3, 2018.
Office action of U.S. Appl. No. 15/196,301 dated May 23, 2018.
Office action of U.S. Appl. No. 15/196,338 dated Jule 26, 2018.
Muter M. et al. "Entropy-Based Anomaly Detection for In-Vehicle Networks", In Intelligent Vehicles Symposium (IV), 2011 IEEE, Jun. 5-9, 2011, pp. 1110-1115.
Larson et al. "An Approach to Specification-based Attack Detection for In-Vehicle Networks", In Intelligent Vehicles Symposium, 2008 IEEE, Jun. 4-6, 2008, pp. 220-225.
Cook et al. "Controller Area Network (CAN)", EECS 461, Fall 2008.
Final office action of U.S. Appl. No. 15/196,252 dated Nov. 23, 2018.
European office action of EP Application No. 16176885.8 dated Sep. 20, 2018.
Office action of U.S. Appl. No. 15/272,934 dated Aug. 10, 2018.
Office action of U.S. Appl. No. 15/196,226 dated Nov. 26, 2018.
Office Action for U.S. Appl. No. 15/196,252 dated Aug. 19, 2019.
Office Action for U.S. Appl. No. 15/272,934 dated Aug. 21, 2019.
Notice of Allowance for U.S. Appl. No. 15/196,226, dated Jan. 15, 2020.
Office Action for U.S. Appl. No. 15/272,934 dated Mar. 9, 2020.
Final Office Action for U.S. Appl. No. 15/196,226, dated Jan. 27, 2021.
Office Action for U.S. Appl. No. 16/789,445 dated Jun. 18, 2021.
Notice of Allowance for U.S. Appl. No. 15/196,226 dated May 17, 2021.

* cited by examiner

SYSTEM AND METHOD FOR PROVIDING SECURITY TO A COMMUNICATION NETWORK

CROSS-REFERENCE TO RELATED APPLICATIONS

This application claims the benefit of U.S. Provisional Patent Application No. 62/185,943, entitled "Disruptor Watchman", filed on Jun. 29, 2015, which is incorporated in its entirety herein by reference.

FIELD OF THE INVENTION

The present invention relates generally to providing cyber security for in-vehicle communication networks. In particular, embodiments of the invention relate to protecting a node on an in-vehicle communication network from being configured or modified by an unauthorized or malicious entity.

BACKGROUND OF THE INVENTION

Over the last half a century the automotive industry has, initially slowly, and subsequently with great rapidity, been evolving from mechanical control systems for controlling a vehicle's functions to electronic "drive by wire" control systems for controlling the functions. In mechanical vehicular control systems, a driver of a vehicle controls components of a vehicle that control vehicle functions by operating mechanical systems that directly couple the driver to the components via mechanical linkages. In drive by wire vehicle control systems a driver may be coupled directly, and/or very often indirectly, to vehicle control components that control vehicle functions by electronic control systems and electronic wire and/or wireless communication channels, rather than direct mechanical linkages. The driver controls the control components by generating electronic signals that are input to the electronic control systems and the communication channels.

Typically, a vehicular electronic control system includes a user interface for receiving driver actions intended to control a vehicle function, transducers that convert the actions to electronic control signals, and a plurality of sensors and/or actuators that generate signals relevant to the function. An electronic control unit (ECU) of the control system receives the user generated signals and the signals generated by the sensors and/or actuators, and responsive to the signals, operates to control a vehicle component involved in performing the function. The ECU of a given control system may also receive and process signals relevant to performance of the function generated by, and/or by components in, other vehicle control systems. The sensors, actuators, and/or other control systems communicate with each other and the ECU of the given control system via a shared in-vehicle communication network, to cooperate in carrying out the function of the given control system.

By way of example, a vehicle throttle by wire control system that replaces a conventional cable between an accelerator pedal and an engine throttle may include an electronic accelerator pedal, an ECU, also referred to as an engine control module (ECM), and an electronic throttle valve that controls airflow and/or fuel injection into the engine and thereby the power that the engine produces. The electronic accelerator pedal generates electronic signals responsive to positions to which a driver depresses the pedal. The ECM receives the accelerator pedal signals, and in addition electronic signals that may be generated by other sensors, actuators, and electronic control systems in the vehicle that provide information relevant to the safe and efficient control of the engine via an in-vehicle communication network. The ECM processes the driver input signals and the other relevant signals to generate electronic control signals that control the throttle. Among the other sensors actuators, and electronic control systems that may provide relevant signals to the ECM over the in-vehicle network are, air-flow sensors, throttle position sensors, fuel injection sensors, engine speed sensors, vehicle speed sensors, brake force and other traction control sensors included in a brake by wire system, and cruise control sensors.

In-vehicle communication networks of modern vehicles are typically required to support communications for a relatively large and increasing number of electronic control systems of varying degrees of criticality to the safe and efficient operation of the vehicles. A modern vehicle may for example be a home to as many as seventy or more control system ECUs that communicate with each other and sensors and actuators that monitor and control vehicle functions via the in-vehicle network. The ECU's may, by way of example, be used to control in addition to engine throttle described above, power steering, transmission, antilock braking (ABS), airbag deployment, cruise control, tire pressure monitor system (TPMS), keyless entry system, power windows, doors, and mirror adjustment. In addition, an in-vehicle network typically supports on board diagnostic (OBD) systems and communication ports, various vehicle status warning systems, collision avoidance systems, audio and visual information and entertainment (infotainment) systems and processing of images acquired by on-board camera systems. An in-vehicle network in general may also provide access to wireless communication networks, e.g., mobile network, WiFi and Bluetooth communication, vehicle to vehicle communication (V2V), vehicle to anything or vehicle to infrastructure communication (V2X), the Internet and global positioning systems (GPS).

Various communication protocols have been developed to configure, manage, and control communications of vehicle components that are connected to, and communicate over, an in-vehicle communication network. Popular in-vehicle network communication protocols currently available are control area network (CAN), FlexRay, Media Oriented Systems Transport (MOST), Ethernet, and local interconnect network (LIN). The protocols may define a hardware communication bus, electronic signals used on a bus and how the ECUs, sensors, and actuators, generically referred to as nodes, connected to the communication bus, access and use the bus to transmit signals to each other.

The growing multiplicity of electronic control systems, sensors, actuators, ECUs and communication interfaces and ports, that an in-vehicle communication network supports makes the in-vehicle communication network, and the vehicle components that communicate via the communication system, increasingly vulnerable to cyber-attacks that may dangerously compromise vehicle safety and performance.

ECUs may be configured to receive data (e.g., "update data" that may include software updates) over an in-vehicle network. For example, a session initiator (for example, a diagnostic terminal) may transfer update data to a target node, device or component, e.g., an ECU ("target ECU") that is targeted for receiving the transferred update data. Establishment and execution of an update data transfer session (which may be referred to herein as a "transfer session") may include preparatory steps performed by the initiator and target ECU, which steps may be characterized at being part of the following stages: a "session request stage" in which the initiator transmits a "session request" message to request a transfer session with the target ECU; a "security access stage" in which the initiator exchanges security messages with the target ECU to gain security access; and a "pre-transfer stage" in which the initiator transmits an "update start" message to the target ECU that notifies that the initiator is ready to begin transferring update data, and may include specifications regarding the upcoming update data transfer, for example size of the update data. By way of example control of the transfer session between the initiator and the target ECU may follow the ISO 14229 Unified Diagnostic Services (UDS) standard. A transfer session as referred to herein may relate to any transfer, exchange or communication of data, that may be performed according to any communication, diagnostic or other protocol. Accordingly, it will be understood that a device such as an SEU may disrupt any form or type of data communication or exchange between any two or more nodes on a network.

Update data may include instructions that alter the function of the ECU. By way of example, update data may be a firmware update. Alternatively, or additionally, update data may include instruction, or data that results in instructions, for a given action to be executed by a control system comprising the ECU. As such, a malicious entity may take advantage of the software update process by emulating a session initiator, by way of example by attacking and taking over a node in the in-vehicle network, gain security access to the ECU and transfers malicious update data that alters ECU function in a way that compromises vehicle safety and/or performance. By way of example, the update data may include a firmware update and/or instructions that reconfigure the engine unit to be less efficient, overcharge or undercharge batteries, disable or improperly activate brake units, unlock car doors, change persistent records such as the odometer or the vehicle identification number (VIN), or disable dashboard warning lights.

SUMMARY OF THE INVENTION

In some embodiments, a message sent over a network, the message related to a data transfer from an initiator to a target node, may be identified. At least one disruptive message that causes the data transfer to fail may be transmitted.

An identified message may be for example: a message sent by the initiator in order to prepare the target node to receive the data transfer and a message sent by the target node in reply to a message sent by the initiator. A disruptive message may modify a state of a node. An embodiment may select whether or not to send a disruptive message based on a context.

An embodiment may send a first disruptive message to an initiator of a session and a second disruptive message to a target node. A disruptive message may be selected according to a predefined protocol. A disruptive message may be selected based on at least one of: a context, a message received by a controller, the target node and a stage of a session.

BRIEF DESCRIPTION OF THE DRAWINGS

Non-limiting examples of embodiments of the disclosure are described below with reference to figures attached hereto that are listed following this paragraph. Identical features that appear in more than one figure are generally labeled with a same label in all the figures in which they appear. A label labeling an icon representing a given feature of an embodiment of the disclosure in a figure may be used to reference the given feature. Dimensions of features shown in the figures are chosen for convenience and clarity of presentation and are not necessarily shown to scale.

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

DETAILED DESCRIPTION

Figure 1A:
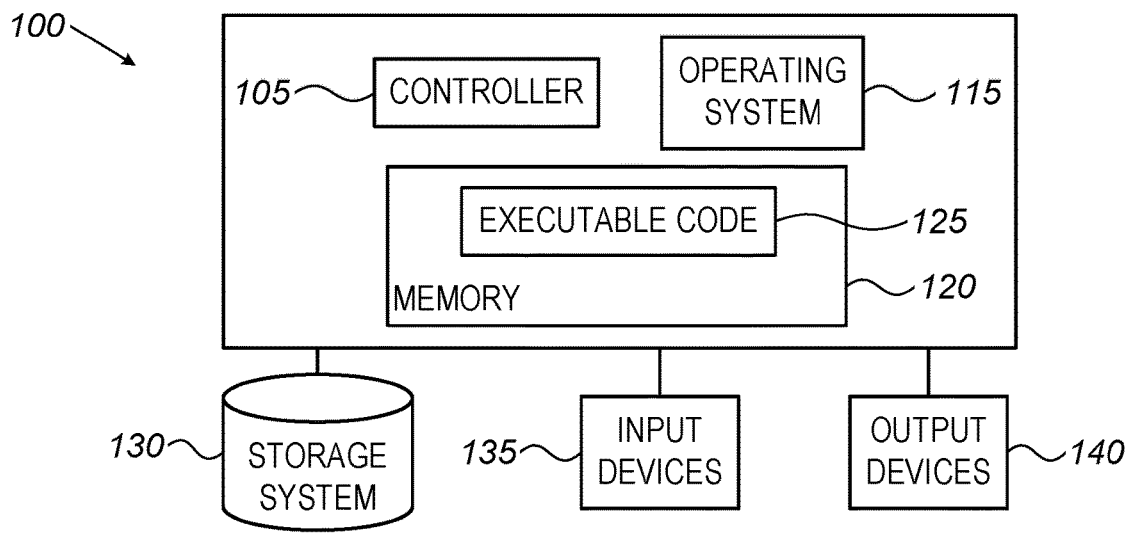
FIG. 1A shows high level block diagram of an exemplary computing device according to illustrative embodiments of the present invention.

In the following detailed description, numerous specific details are set forth in order to provide a thorough understanding of the invention. However, it will be understood by those skilled in the art that the present invention may be practiced without these specific details. In other instances, well-known methods, procedures, and components, modules, units and/or circuits have not been described in detail so as not to obscure the invention. Some features or elements described with respect to one embodiment may be combined with features or elements described with respect to other embodiments. For the sake of clarity, discussion of same or similar features or elements may not be repeated.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term set when used herein may include one or more items. Unless explicitly stated, the method embodiments described herein are not constrained to a particular order or sequence. Additionally, some of the described method embodiments or elements thereof can occur or be performed simultaneously, at the same point in time, or concurrently.

A system and method according to some embodiments of the invention may include or use one or more computing devices in order to detect or identify security threats, detect or identify events or states that may jeopardize the security or proper function of a system and/or a network, or identify and avert errors or malfunctions in units sending or receiving messages, or in a network. In some embodiments and as described, one or more computing devices may be used in order to enforce security in network. For example, a system according to some embodiments may include one or more computing devices 100 as described herein, e.g., with respect to FIG. 1A. It will be understood the providing or enforcing security as referred to herein may include any security related operations, for example, enforcing or providing security in a network may include destroying messages or content communicated over a network, blocking messages, preventing data from reaching its intended destination as well as detecting threats, logging or recording threats or intrusions, alerting and so on.

Reference is made to FIG. 1A, showing a high level block diagram of an exemplary computing device according to some embodiments of the present invention. Computing device 100 may include a controller 105 that may be, for example, a central processing unit processor (CPU), a chip or any suitable computing or computational device, an operating system 115, a memory 120, executable code 125, a storage system 130, input devices 135 and output devices 140. Controller 105 (or one or more controllers or processors, possibly across multiple units or devices) may be configured to carry out methods described herein, and/or to execute or act as the various modules, units, etc. More than one computing device 100 may be included in, and one or more computing devices 100 may act as the components of, a system according to embodiments of the invention.

For example, on board, or in-vehicle, security enforcement units (SEUs) (as further described herein) may be, or may include components of, computing device 100. For example, by executing executable code 125 stored in memory 120, controller 105, e.g., when included in a security enforcement unit as described, may be configured to carry out a method of enforcing or providing cyber-security in a vehicle as described herein. For example, included in a security enforcement unit, controller 105 may be configured to enforce and/or provide cyber-security in a vehicle, e.g., by destroying a message sent by a malicious or other entity, or otherwise prevent a message from reaching a node on an in-vehicle network as further described herein.

Operating system 115 may be or may include any code segment (e.g., one similar to executable code 125 described herein) designed and/or configured to perform tasks involving coordination, scheduling, arbitration, supervising, controlling or otherwise managing operation of computing device 100, for example, scheduling execution of software programs or tasks or enabling software programs or other modules or units to communicate. Operating system 115 may be a commercial operating system. It will be noted that an operating system 115 may be an optional component, e.g., in some embodiments, a system may include a computing device that does not require or include an operating system 115. For example, an SEU may be, or may include, a microcontroller, an application specific circuit (ASIC), a field programmable array (FPGA) and/or system on a chip (SOC) that may be used (e.g., as, or included in, an SEU) without an operating system.

Memory 120 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 120 may be or may include a plurality of, possibly different memory units. Memory 120 may be a computer or processor non-transitory readable medium, or a computer non-transitory storage medium, e.g., a RAM.

Executable code 125 may be any executable code, e.g., an application, a program, a process, task or script. Executable code 125 may be executed by controller 105 possibly under control of operating system 115. For example, executable code 125 may be an application that enforces and/or provides security in a vehicle as further described herein. Although, for the sake of clarity, a single item of executable code 125 is shown in FIG. 1A, a system according to some embodiments of the invention may include a plurality of executable code segments similar to executable code 125 that may be loaded into memory 120 and cause controller 105 to carry out methods described herein.

Storage system 130 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. Content may be stored in storage system 130 and may be loaded from storage system 130 into memory 120 where it may be processed by controller 105. In some embodiments, some of the components shown in FIG. 1A may be omitted. For example, memory 120 may be a non-volatile memory having the storage capacity of storage system 130. Accordingly, although shown as a separate component, storage system 130 may be embedded or included in memory 120.

Input devices 135 may be or may include any suitable input devices, components or systems, e.g., a detachable keyboard or keypad, a mouse and the like. Input devices 135 may include an interface to an in-vehicle network or communication bus (e.g., CAN bus 61 described herein), input devices 135 may include components in a vehicle, e.g., engine control unit 62, suspension control unit 64, gearbox control unit 63 and/or any other units connected to an in-vehicle network as described herein may be included in input devices 135. Output devices 140 may include one or more (possibly detachable) displays or monitors, speakers and/or any other suitable output devices. Output devices 140 may include an interface to an in-vehicle network or communication bus (e.g., CAN bus 61 described herein), output devices 140 may include components in a vehicle, e.g., engine control unit 62, suspension control unit 64, gearbox control unit 63 and/or any other units connected to an in-vehicle network as described herein may be included in input devices 135. Any applicable input/output (I/O) devices may be connected to computing device 100 as shown by blocks 135 and 140. For example, a wired or wireless network interface card (NIC), a universal serial bus (USB) device or external hard drive may be included in input devices 135 and/or output devices 140. It will be recognized that any suitable number of input devices 135 and output device 140 may be operatively connected to computing device 100 as shown by blocks 135 and 140. For example, input devices 135 and output devices 140 may be used by a technician or engineer in order to connect to an SEU (that may be or may include computing device 100), download data from an SEU, configure the SEU, update software and the like.

A system according to some embodiments of the invention may include components such as, but not limited to, a plurality of central processing units (CPU) or any other suitable multi-purpose or specific processors or controllers (e.g., controllers similar to controller 105), a plurality of input units, a plurality of output units, a plurality of memory units, and a plurality of storage units. A system may additionally include other suitable hardware components and/or software components. In some embodiments, a system may include or may be, for example, a plurality of components that include a respective plurality of central processing units, e.g., a plurality of SEUs as described, a plurality of SEUs embedded in an on board, or in-vehicle, system or network, a plurality of chips, FPGAs or SOCs, a plurality of computer or network devices, or any other suitable computing device. For example, a system as described herein may include one or more devices such as computing device 100.

As described, an embodiment may include or use one or more computing devices in order to provide and/or enforce security, detect or identify security threats, detect or identify events or states that may jeopardize security, or proper function, of a vehicle and/or an in-vehicle network and nodes attached thereto. In some embodiments and as described, one or more computing devices (e.g., computing devices similar to computing device 100) may be used or deployed in order to enforce and provide security in an on board, or in-vehicle, network. It will be understood the enforcing and/or providing security as referred to herein may include enforcing and providing any security related measures or aspects, e.g., enforcing or providing security in an in-vehicle network may include blocking messages, preventing a message or data from reaching a node, identifying threats, logging or recording events that may be related to threats or malicious activity, alerting, disabling or enabling components in a network and so on.

An aspect of an embodiment of the invention relates to an in-vehicle security module, e.g., an SEU as described, that detects and disrupts an update data transfer to an ECU over an in-vehicle network. In some embodiments, an SEU may identify a preparation for transferring data to an ECU, and may prevent transferring data to the ECU. In some embodiments, an SEU may identify, detect or determine that data is being transferred to an ECU and may prevent additional data from being transferred to the ECU. For example, a malicious or malfunctioning unit may attempt to transfer data to an ECU, an SEU may detect such attempt, and may prevent the malicious or malfunctioning unit from transferring data to the ECU. While in some embodiments, an SEU is used, other controllers or units may perform functions described herein. While in some embodiments, a network and components in an automobile or other vehicle (e.g. truck, boat) are described, in other embodiments the network need not be in a vehicle.

For example, an SEU installed in a vehicle may monitor communication traffic over an in-vehicle network and may identify messages (e.g., "prep messages" as described herein) designed for, or that indicate a, preparation for a transfer session from an initiator to a target ECU connected to the in-vehicle network. While in embodiments described herein a prep message is described, other messages that indicate a preparation or precursor of a transfer session or other communication of data may be used. In some embodiments, an SEU may, responsive to detecting a transfer session or an attempt to transfer data to an ECU, transmit at least one message (e.g., a "disrupting message" as described herein) to disrupt the transfer session or attempt to transfer data, optionally during a preparation phase of the transfer session, before any portion of the update data or other information is received by the target ECU. For example, in some embodiments, prep messages and disrupting messages generated and sent by an SEU are in accordance with the ISO 14229 standard. Other standards or formats may be used.

In some embodiments, an SEU may be a module that identifies prep messages transmitted over a vehicle's in-vehicle network thus identifying or detecting a transfer session, classifies a current stage of the transfer session responsive to the prep message, and an SEU may determine, or select, a disrupting message that is appropriate for the classified stage of the transfer session and may send the selected disruptive message as described.

In some embodiments, a disrupting message selected by an SEU may be a pseudo-message that may be perceived by another network element, e.g., perceived by the initiator or the target ECU, as originating from the initiator or from the target ECU.

In some embodiments, an SEU may include a memory (e.g., memory 120 or storage system 130) that includes (or used for storing) data characterizing messages that an ECU transmits to, and receives from, the in-vehicle network. In some embodiments, an SEU may include a communication port (e.g., included in I/O devices 135 and 140) for receiving and transmitting messages, the port being configured to be connected to a portion of the in-vehicle network. In some embodiments, an SEU may include a processor or controller (e.g., controller 105) adapted to process, responsive to the data in the memory, messages received via the port such that an SEU may identify or determine that a message is indicative of, or designed for, a preparation of an ECU to receive data, and an SEU may, in response to identifying such message, transmit at least one disrupting message to the in-vehicle network that causes the transfer of data to fail or to not take place.

Figure 1B:
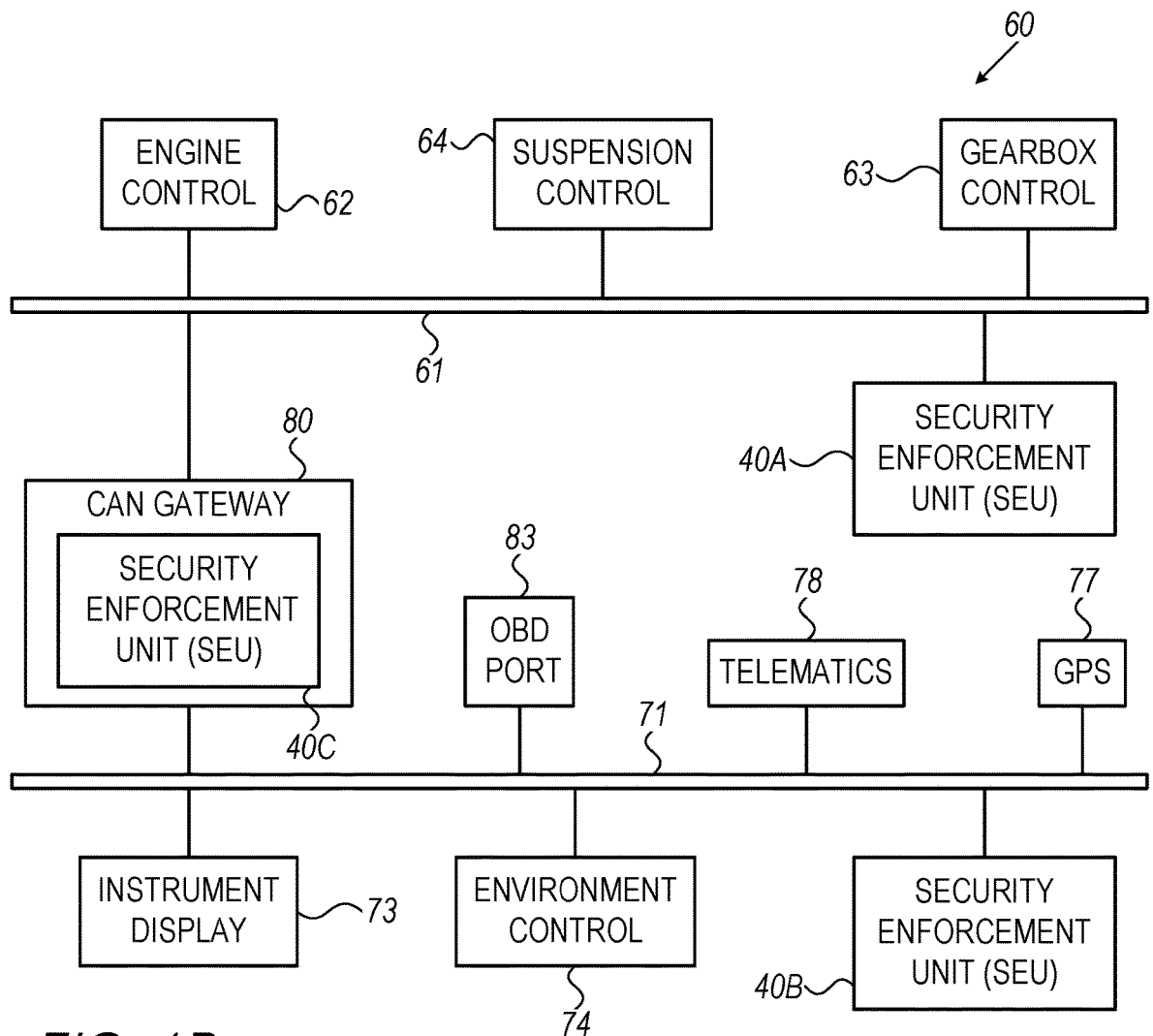
FIG. 1B shows a schematic block diagram of a system in accordance with an embodiment of the disclosure.

Reference is made to FIG. 1B that shows a schematic block diagram of a system that includes a network such as in-vehicle network 60 in accordance with an embodiment of the invention. Networks not in the context of a vehicle may be used. As shown, an in-vehicle communication network 60 of a vehicle may be protected by one or more SEUs. As shown, a system may include an in-vehicle communication network 60, an SEU 40A, SEU 40B and an SEU 40C that protect the network.

In some embodiments, in-vehicle communication network 60 may be Controller Area Network (CAN) network comprising a medium-speed CAN bus 61 and a high-speed CAN bus 71 to which various components of the vehicle are connected as nodes. A first SEU (e.g., SEU 40A) may be connected to a first portion of an in-vehicle network, e.g., to CAN bus 61 as shown, and a second SEU (e.g., SEU 40B) may be connected to a second portion of portion of an in-vehicle network, e.g., to CAN bus 71 as shown. Data may be transmitted between nodes connected to buses 61 and 71 in data packets, CAN frames, which may be referred to herein as CAN packets, CAN messages or simply messages. Networks other than CAN networks may be used.

Medium-speed CAN bus 71 may be a class B CAN bus that operates at data transmission speeds of up to 125 kilobits per second (Kbps), to support communications between nodes, such as components of vehicle body control systems that can function properly receiving and transmitting data at relatively low data transmission rates. By way of example, medium-speed CAN bus 71 is schematically shown connected to nodes that are instrument display 73 and environment control 74. Telematics system 78 may provide a wireless interface to communicate with external communication networks such as mobile phone networks, WiFi and Bluetooth. A GPS receiver 77 may be a separate unit (e.g., not included in Telematics system 78), and may be connected to medium-speed CAN bus 71 as shown. As shown, an OBD port 83 may be included in, or connected to, network 60.

High-speed CAN bus 61 may be a class C CAN bus that operates at data transmission speeds of up to 1 megabits per second to support communications between nodes such as sensors and ECUs of various control systems that may require relatively high-speed transmission of data between the nodes to operate properly. For example, high-speed CAN bus 61 is schematically shown connected to engine control 62, suspension control 64, and gearbox control 63. Other speeds and network designs may be used.

High-speed CAN bus 61 may be connected, e.g. by a CAN gateway 80 as shown, to medium-speed CAN bus 71. CAN gateway may include an SEU 40C as shown, for example, SEU 40C may be embedded in CAN gateway 80 such that a single unit, component or device include CAN gateway and SEU 40C and, accordingly, a single unit, component or device may perform any operation as described herein with respect or reference to an SEU and/or CAN gateway 80. CAN gateway 80 may include computer executable instructions and data, or a combination of software and hardware that provide security functionalities for monitoring and filtering potentially harmful messages. Gateway 80 security functionalities may improve security and control that may be crucial for proper functioning of the core driving operations and controls of the vehicle, for example, critical control units such as engine control 62 may be connected to high-speed CAN bus 61 and less critical control units such as environment control 74 may be connected to medium-speed CAN bus 71.

In some embodiments, high-speed CAN bus 61 may be isolated from external networks, e.g., by CAN gateway 80 as shown. For example, and as shown, medium-speed CAN bus 71 may include wireless access points (e.g., Telematics system 78 and GPS receiver 77) that are common attack vectors for malicious entities and may be used in order to enter in-vehicle network 60. Therefore, high-speed CAN bus 61 may be better protected (though not immune) from malicious entity infiltration and attacks compared to medium-speed CAN bus 71. As such, high-speed CAN bus 61 may be referred to herein as a "clean bus" and medium speed CAN bus 71 may be referred to herein as a "dirty bus".

In some embodiments, in-vehicle network 60 may be protected by one or more SEUs, e.g., individualized by labels 40A and 40B as shown in FIG. 1B. SEUs connected to network 60 are herein referenced generically by the numerical reference 40 and/or by the individualized labels 40A and 40B with respect to features associated with a particular SEU. For example, SEU 40A may be a single communication port module, connected as a node to high-speed bus 61, and SEU 40B may be a single communication port module connected as a node to medium-speed bus 71. SEU 40A may be connected to high-speed CAN bus 61 to eavesdrop on communications over the high-speed bus and protect nodes connected to the bus. SEU 40B may be connected to medium-speed CAN bus 71 to eavesdrop on communications over the medium-speed bus and protect nodes connected to the bus. It will be noted that SEUs in accordance with some embodiments of the invention are not limited to the number of communication ports shown in FIG. 1B and may have a number of communication ports different from the numbers shown in FIG. 1B. By way of example, an SEU may include two ports, e.g., the SEU may be connected to medium-speed CAN bus 71 and to high-speed CAN bus 61 and may therefore be adapted to monitor or receive messages or data packets that are transmitted from or to any node in network 60, or to monitor or receive messages that are transmitted between a CAN buses and Gateway 80.

Whereas in FIG. 1B, SEUs 40 are schematically shown as separate components that may be hardware components, an SEU in accordance with some embodiments of the invention may be implemented in hardware, e.g., as dedicated circuitry, and/or a "virtualized SEU" defined or implemented by a software component included in a node of in-vehicle communication network 60, executed by a general purpose processor, e.g. as shown in FIG. 1A. For example, gateway 80 may be, or may include components of computing device 100, e.g., include computer executable instructions and data, or a combination of software and hardware that provide SEU functionalities in accordance with some embodiments of the invention as described. For example, CAN gateway 80 may provide, carry out or perform functionalities provided, carried out or performed by SEU 40A and/or SEU 40B as described herein.

Alternatively, or additionally, an ECM (not shown) in engine control system 62 may include computer executable instructions and data, executed by a processor, that provide SEU functionalities in accordance with some embodiments of the invention, e.g., functionalities provided by SEU 40A. In some embodiments, an SEU may be integrated, or embedded, in the hardware of a node, such as telematics system 78, of in-vehicle communication network 60.

In some embodiments, a wireless interface included in network 60 may be a wireless interface module included d, embedded or included, in an SEU (not shown) thus providing an SEU with its own, separate wireless connectivity. For example, in some embodiments, an SEU may include a WiFi module or system, a Bluetooth, and/or mobile phone network connectivity system. In some embodiments, e.g., if an SEU does not include its own networking unit or capabilities, an SEU may communicate with an outside or external entity (e.g., a device not connected to network 60) over an existing vehicle connection to an external network.

For example, in some embodiments, tunneling as known in the art may be used in order to provide an SEU with connectivity to entities or networks outside, or external to, a vehicle in which the SEU is included or installed. For example, messages may be tunneled via a CAN bus (e.g., tunneled via CAN bus 71 or CAN bus 61) from an SEU to an ECU in the in-vehicle network 60 that has, or provides, connectivity to an external network. For example, in some embodiments, tunneling may be implemented or achieved using methods known in the art, for example, by reading and writing parameter identifiers (PIDs), e.g., according to a Unified Diagnostic System Standard or by using any other protocol supported by a CAN or other bus as known in the art. In some embodiments, connectivity to external networks may be provided, e.g., to an SEU, by a node on network 60 (e.g., engine control 62 or suspension control 64 shown in FIG. 1B) that may include a wireless interface module.

An SEU 40, such as SEU 40A or 40B in accordance with some embodiments, may operate in a mode or modes selectable from a library of operating modes. Each operating mode in a library may evoke optionally different actions, responses to events or messages, operating algorithms and/or procedures that an SEU may execute when processing and/or responding to messages or data transmitted over an in-vehicle network 60 that the SEU monitors. A library of operating modes may include at least one of, or any combination of more than one of: a passive mode and a protection mode. Various other modes may be contemplated.

As further described, an SEU may be set or configured to operate or function in a passive mode that may be an operational mode that, for example, enables a technician to upgrade firmware in control units, and where sessions, data transfer, messages or other communications are not blocked, disrupted or prevented.

For example, when operating in passive mode, an SEU 40 may avoid or refrain from interfering with transfer of update data in an in-vehicle network 60. In some embodiments, an SEU 40 may be set to the passive mode during installation of new components and/or sensors in a vehicle and connection of the components and/or sensors as nodes to in-vehicle communication network 60. For example, in order to prevent an SEU from interfering with an update or installation of a new node or component, the SEU may be set to passive mode such that it remains passive, e.g., does not interfere with messages (or other data communications) during the installation or update procedure.

As further described, an SEU may be set or configured to operate or function in a passive mode that may be an operational mode that, for example, enables a technician to upgrade firmware in control units, and where messages are not blocked, disrupted or prevented.

In some embodiments, an SEU may be set (or automatically set itself) to passive mode, for example, when a diagnostic console is connected to OBD port 83. For example, a technician may connect a diagnostic tool in order to query a vehicle's self-diagnostics and reporting functionalities system, e.g., in order to obtain information regarding systems connected to network 60 as known in the art. For example, an SEU may be configured to authenticate a diagnostic console (e.g., using a cryptographic handshake as known in the art) when detecting the diagnostic console was connected to a network, and, if the diagnostic console is authenticated, the SEU may automatically switch to passive mode.

An SEU may automatically switch to protective mode, e.g., when detecting that the diagnostic console was disconnected from a network that the SEU protects as described. In some embodiments, an SEU 40 may be configured to automatically set itself to a passive mode when it encounters a critical internal error, e.g., as a failsafe mechanism.

In some embodiments, if or when, an SEU is executing, running, functioning or operating in protective mode, the SEU may prevent or disrupt (e.g., as described herein) any session, communication or data transfer related to configuring or updating nodes on a network. Accordingly, when an SEU connected to a network is in protective mode, the network and nodes connected to the network may be protected from any attempt made by any entity to modify the network and/or nodes, e.g., change firmware in a control unit or otherwise configure a control unit. As further described, an SEU may be set or configured to operate or function in a passive mode that may be an operational mode that, for example, enables a technician to upgrade firmware in control units. For example, a default operational mode of an SEU may be a protective operational mode in which the SEU may prevent any modifications of nodes as described.

As described, if put in passive mode (e.g., by a technician who connected a diagnostics system to a network) an SEU may automatically switch (e.g., back) to protective mode, e.g., if for a predefined time period no messages are received from a diagnostics system (and it may be assumed that the technician has disconnected from the network).

In some embodiments, an SEU may automatically and/or autonomously, assume, or set itself to, a selected operational mode, e.g., an SEU may automatically and/or autonomously select and/or assume, or switch to one of: a passive or normal operational mode and a protective or caution operational mode. Other or additional modes may be used. For example, if when set to passive mode, an SEU identifies a suspicious behavior or event, the SEU may switch to protective mode. The suspicious behavior may include, may be determined or may be identified by unusual operation of devices or components in the system, unusual or suspicious messages, unusual or suspicious events or unexpected messages or events.

For example, if ambient, or outside, temperature is 100° Fahrenheit and a heating ventilation and air conditioning (HVAC) system or a climate control system, is set to heating, then an SEU may identify such event (e.g. based on a messages sent by the HVAC system), determine this event is suspicious, a malfunction, anomalous, unexpected or otherwise requires protecting a system, and may therefor switch to protective mode, e.g., a mode in which the SEU may prevent a malicious entity from communicating with nodes on a network as described. In another case, if an SEU identifies an authenticated connection to an OBD port when the SEU is operating in protective mode then the SEU may automatically switch to passive mode, e.g., in order to allow a technician to send, or cause nodes to send, any (possibly unexpected) messages over an in-vehicle network.

An SEU may switch, assume or change operational modes based on a command, message or procedure. For example, an SEU may be adapted to perform, or participate in, a cryptographic handshake as known in the art, e.g., a cryptographic handshake initiated by a technician that may thus switch the SEU to a passive or protective mode. An SEU may automatically and/or autonomously select an operational mode based on a context, time consideration (e.g., a time lapse or interval) or based on an event or message. For example, after assuming a passive mode based on a message or based on detecting an authenticated connection of a diagnostics system to a network, an SEU may switch back to protective mode after a predefined time period thus ensuring that in any case, an in-vehicle network is not left unprotected (e.g., in case a disconnection of the diagnostics system was not properly identified). In other exemplary case, an SEU may monitor a session (e.g., a session between a diagnostics system and a node on an in-vehicle network) and, upon identifying the monitored session was terminated (e.g., by receiving or intercepting a message), the SEU may revert back to protective mode. In yet other cases, an SEU may assume, or switch to, an operational mode, based on a message it receives, e.g., based on a message that includes an instruction or command.

An SEU 40 may be set to a given operating mode by manually operating a DIP (dual in-line package) switch that may be included in an SEU. Alternatively, or additionally, an SEU may assume, or be set to, an operating mode responsive to a state of the vehicle, which may include one or a combination of two or more of: a speed of the vehicle, an engine or vehicle state or context, e.g., an engine temperature or oil pressure, a presence or absence of an authorized driver, and the location of the vehicle.

In some embodiments, an SEU may automatically assume a specific operating mode based on receiving a message, e.g., a control message sent to the SEU via a wire or wireless communication channel and that instructs the SEU to assume a particular operating mode. For example, a control message may be, or may include, a security token that sets, changes or moves, an SEU from a first to a second mode. In some embodiments, a security token may be wirelessly transmitted from a remote server and may be received by an SEU via a node on network 60 that may include wireless or external facing interfaces as described, e.g., telematics 78.

A security token, e.g., included in a message sent to, and received by, an SEU, may include or define a set of configuration parameters or values, e.g., a mode and time value or indication. For example, a control message may include a time-period an SEU is to remain in a first mode before changing to a second mode, e.g., remain in passive mode for 2 seconds then move to protection mode. A configuration mode in a message or token may indicate the time an SEU is to remain in a mode, e.g., change to protection mode and remain in this mode for 45 seconds and so on. As further described herein, in protection or protective mode, a device or controller such as an SEU may operate or function according to an algorithm that includes a set of response actions that may be undertaken by the SEU in response to a respective set of messages propagated over in-vehicle network 60 and/or a set of contexts or conditions.

Figure 2:
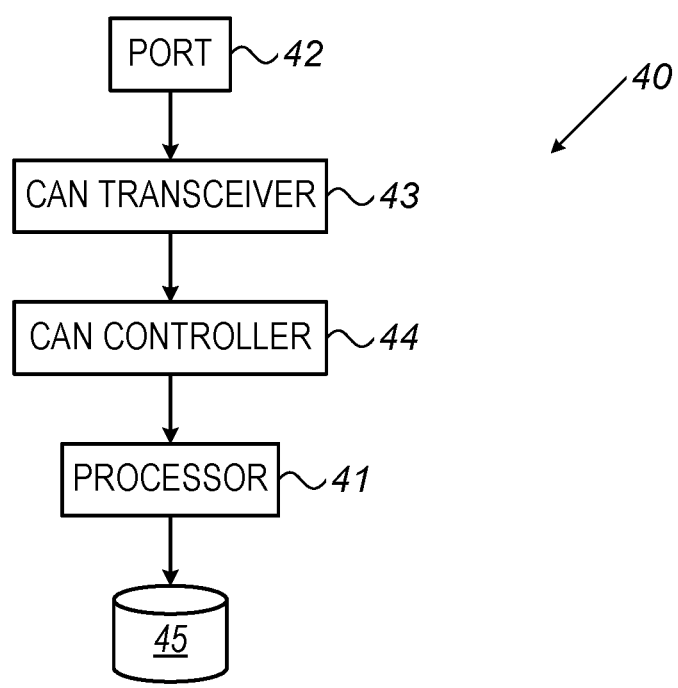
FIG. 2 shows a schematic block diagram of components of a system according to illustrative embodiments of the present invention.

Reference is made to FIG. 2 that shows a schematic block diagram of components of a system 200 according to illustrative embodiments of the present invention. In particular, FIG. 2 schematically shows components of an SEU, for example SEU 40A connected to in-vehicle communication network 60, in accordance with an embodiment of the invention. As shown, an SEU may include a processor 41 that may be similar to controller 105. Generally, the terms "processor", "controller" and "CPU" may relate to the same component, device or system and may be used herein interchangeably. As shown an SEU may include a CAN controller 44, a CAN transceiver 43, a port 42 and a storage system or memory 45.

Port 42 may enable an SEU to transmit messages to, and receive messages from, a CAN bus. For example, port 42 may be connected to high-speed bus 61. Port 42 may be connected to processor 41 by a CAN transceiver 43 and a CAN controller 44 as shown. Transceiver 43 may be an electronic component that converts bits in a CAN message, which may be serially received from high-speed bus 61 at port 42, from CAN format to a format used by an SEU. Transceiver 43 may forward the bits to CAN controller 44. CAN controller 44 may store bits received from transceiver 43 until all the bits in a CAN message to which the bits belong are received and the complete message is assembled. CAN controller 44 may forward an assembled message to processor 41 for processing in accordance with an embodiment of the invention. CAN controller 44 may receive bits generated by processor 41 for transmission from an SEU to high-speed CAN bus 61 in a CAN message, and may forward the bits to transceiver 43 for conversion from an SEU format in which the bits are generated to a CAN format. Transceiver 43 may forward the bits in the CAN format for transmission to CAN bus 61 via port 42.

Processor 41 may process a message it receives via port 42 in accordance with computer executable instructions for executing an algorithm for selecting response actions appropriate for a given message received by an SEU. For example, the computer executable instructions may be stored in memory 45.

Generally, and as described herein, in some embodiments, an SEU may prevent or disable a first node, device, component or entity (also referred to herein as an initiator, or session initiator) from communicating with, and more specifically, configuring or modifying operations of, a second node, device, component or entity (also referred to herein as a target ECU). For example, a session initiator (e.g., a diagnostic terminal) may attempt to transfer data (e.g., data that is, or includes, a software or firmware update) to an ECU ("target ECU"). Such attempt may be detected by an SEU and, based on logic, considerations and data as described, the SEU may prevent the attempt using one or more disrupting messages as described herein.

A disrupting message may be a message or data package that causes a target device such as an ECU to abort a session initiated by an initiator device or entity (e.g., an initiator may be a device connected to a network or software installed in a node on a network) thus effectively preventing the initiator from configuring, modifying or otherwise affect an operation of the target ECU. A disrupting message may be a message that renders data communicated over a bus useless or otherwise destroys data on a bus. A disrupting message may be a message that cause an initiator of a session to abort the session. A disrupting message may be a message that interferes with the session, e.g., with a protocol based synchronization or procedure thus effectively disabling parties of a session to communicate.

A device in an embodiment (e.g., an SEU) may determine or select whether or not to terminate a session (e.g., a session between an initiator and a target ECU), prevent an attempt (e.g., an attempt of an initiator to configure a target ECU) and/or send a disrupting message based on a context, state or event. A device in an embodiment (e.g., an SEU) may select the type (and number) of disrupting messages to transmit based on a context or state.

A context or state as referred to herein may be related to, or determined based on, to at least one of: a state or context of a vehicle, a state or context of an in-vehicle network, and a node connected to the in-vehicle network. An embodiment may identify an event related to at least one of: the vehicle, the network, and a node connected to the network and may determine a state or context based on the event. Accordingly, any action, decision, logic or operation performed by a device in an embodiment, e.g., by an SEU, that may be based on a context or state may likewise be based on an event or message, e.g., the event or message that caused the SEU to determine the state or context as described herein. The terms "vehicle context", "network context", "nodes context" or simply "context" as referred to herein may relate to a state, configuration or any operational or functional aspects of one or more of: a vehicle, an in-vehicle network, and/or one or more nodes connected to the in-vehicle network. Context, vehicle context or context of a vehicle as referred to herein may relate to a state of the vehicle, a state of the vehicle's in-vehicle communication network (e.g., a state of CAN 61) and/or a state of nodes connected to an in-vehicle communication network. Context or state may refer to networks other than in a vehicle. For example, a state or context of a vehicle may be defined (and determined by an SEU 40) responsive to a value for each of at least one parameter, which one or more sensors or nodes in the vehicle provides, for example in a data portion of a CAN message that it transmits. The at least one parameter may for example, include one, or any combination of more than one of, vehicle's speed, acceleration, closing speed to a leading or trailing vehicle, engine revolutions per minute (rpm), engine temperature, oil pressure, hydraulic pressure, wheel traction, road condition, vehicle location optionally provided by a GPS signal, and/or weather condition. State or context of an in-vehicle network (e.g., of CAN 61), may by way of example, be defined (e.g., by an SEU 40) responsive to baud rate, which types of messages are being transmitted over the network, and/or which nodes in in-vehicle communication network (e.g., in CAN 61) are actively communicating over the network. State of in-vehicle communication network may also include a state or contents of a communication session of which the CAN message is a part.

A context or state of a node or device may be, for example, an operational stage or phase, e.g., the node is rebooting, the node is in an initialization stage, the node is restarting and so on. A context or state of a node may be related to an error that occurred at the node or network or any other aspect related to the functioning of the node or network. Accordingly, an SEU 40 may determine, detect or identify a context based on at least one of: a state or other attribute of a vehicle, an in-vehicle network, and a node connected to the network. For example, by examining messages communicated over an in-vehicle network (and, as described, an SEU 40 may receive any of, or even all, messages sent over an in-vehicle network) an SEU 40 may know, or determine or identify, the state of the vehicle itself, nodes on the in-vehicle network as well as the state or context of any one of the nodes connected to an in-vehicle network.

A context or state as referred to herein may be related to a mode, e.g., one of a passive and protective modes that may be assumed, or adhered to, by an SEU as described herein. For example, an SEU may determine or select whether or not to terminate a session (e.g., a session between an initiator and a target ECU), prevent an attempt (e.g., an attempt of an initiator to configure a target ECU) and/or send a disrupting message based on its current operational mode of the SEU.

A device in an embodiment (e.g., an SEU) may determine or select whether or not to terminate a session (e.g., a session between an initiator and a target ECU), prevent an attempt (e.g., an attempt of an initiator to configure a target ECU) and/or send a disrupting message based on a target ECU or node. A device in an embodiment (e.g., an SEU) may select the type (and number) of disrupting messages to transmit based on a target node or ECU.

A device in an embodiment (e.g., an SEU) may determine or select whether or not to terminate a session (e.g., a session between an initiator and a target ECU), prevent an attempt (e.g., an attempt of an initiator to configure a target ECU) and/or send a disrupting message based on a stage of a session. A device in an embodiment (e.g., an SEU) may select the type (and number) of disrupting messages to transmit based on a stage of a session.

A device in an embodiment (e.g., an SEU) may determine or select whether or not to terminate a session (e.g., a session between an initiator and a target ECU), prevent an attempt (e.g., an attempt of an initiator to configure a target ECU) and/or send a disrupting message based on a type of a message, e.g., the type of a message received by an SEU, e.g., a message received from, or sent by, an initiator or a target node. A device in an embodiment (e.g., an SEU) may select the type (and number) of disrupting messages to transmit based a type of a message.

Figure 3:
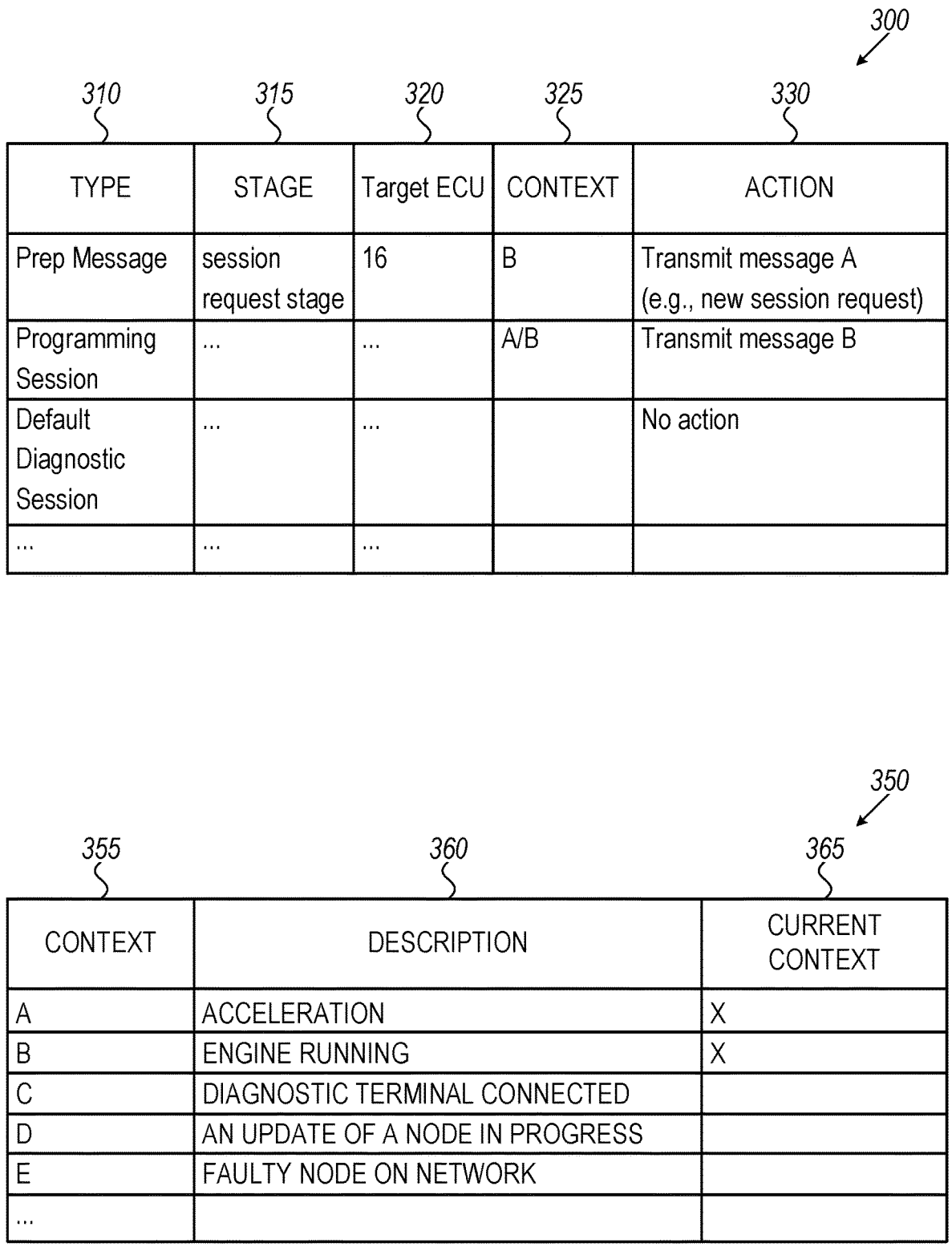
FIG. 3 shows an exemplary data structure according to some embodiments of the invention.

Reference is made to FIG. 3 that shows an exemplary data structure according to some embodiments. It will be noted that the simplified data structure (in the form of table 300) shown in FIG. 3 is provided in order to describe exemplary data that may be included in a memory accessible to an SEU (e.g., memory 120 or 45 described herein) and that any construct, method or system may be used in order to maintain data as described herein. It will be understood that not all information and data that may be used by embodiments of the invention are shown in FIG. 3 and that other or additional data, values and information may be included in a memory and used, by an SEU, in order to determine whether or not to transmit a disrupting message and/or used by an SEU in order to select the specific disrupting message to be transmitted. For example, any objects, constructs, systems and methods known in the art, e.g., a database, a file, linked lists, pointers or other references may be used in order to maintain data as shown in FIG. 3, e.g., in tables 300 and 350. Data as shown in tables 300 and 350 may be stored in storage 130 operatively connected to a controller 105 embedded in an SEU as described.

A plurality of contexts may be defined, known or identified by a system and method according to some embodiments of the invention. Table 350 shows an exemplary set of contexts. Data as shown in table 350 may be stored, e.g., in storage system 130 connected to an SEU as described. As shown by column 355, a name or identifier for each context may be stored such the contexts may be referred to and used by an SEU as described. It will be understood that may construct, object, system or method may be used by embodiments of the invention in order to store, maintain and use contexts and that table 350 is an exemplary and simplified representation of contexts. As shown by the description column 360, a context may be related to a vehicle's state or operation (e.g., engine is running, vehicle is accelerating), a context may be related to an in-vehicle network (e.g., an update of a node is in progress) and a context may be related to nodes attached to an in-vehicle network (e.g., a fault in, or malfunction of, a node or component attached to the in-vehicle network detected). A context may be a combination of contexts or a complex context. For example, with respect to table 350, if a vehicle is accelerating and the engine is running then a combined or complex context as defined and used by an SEU 40 may be "A/B".

For example, and as shown by column 365, the current states or contexts in effect may be marked or checked (e.g., by an SEU upon receiving a message that identifies or changes a state or context) and the effective, combined, complex, or current context or state may be defined, identified or determined, by, or based on, all contexts checked or marked as exemplified in FIG. 3. Logic in an SEU 40 may prioritize contexts when needed, or select a portion of a complex or combined context value. For example, an SEU 40 may ignore the portion of a context that indicates that the infotainment system is on (e.g., the context includes "C" as shown in table 590) when processing a message related to a sensor that monitors and reports engine oil pressure.

As shown by the type column 310, a data structure may include an entry for message type (that may be, or may include a message identifier or identification (ID) value). Accordingly, when an SEU receives a message sent over an in-vehicle network as described, the SEU may find (or may determine) any rules, criteria and/or possible actions related to the message type or ID using data in a storage, e.g., data in table 300 as shown. Accordingly, an SEU may select whether or not to transmit a disrupting message based on a message type or ID and based on stored data, e.g., exemplary data as shown in table 300. For example, and as shown by the top row of table 300, if the type of a message received by an SEU is "prep message" (column 310) (e.g., a message that may be a part of, or belong to, a session or an attempt to establish a session), and the stage or phase of the session is "session request" (column 315), the ID of the target ECU is "16" (column 320), and the context is "B" (column 325), then the SEU may transmit a "new session request" (column 330) message that may disrupt or terminate the session between an initiator and a target ECU.

Operations performed by an SEU or other device as described herein may be performed in real-time. Generally, "real-time" (also known and referred to in the art as "real-time", or "real time") as referred to herein relates to processing or handling of events and acting as described at the rate or pace that the events occur, identified or received (possibly defined by human perception). For example, an SEU according to embodiments of the invention may process messages at the rate or pace messages are received. An SEU may act in real-time, e.g., within milliseconds or other very brief periods after a message is transmitted on an in-vehicle network so that an action related to a message (e.g., transmitting a disrupting message) is performed virtually immediately. For example, an SEU 40 may, in real-time, determine a session should be terminated or disrupted and send a disrupting message, raise an alert, disable a node, or block messages, substantially immediately when receiving a message that caused the SEU to determine the session should be terminated.

Accordingly, in some embodiments, performing an action may be in real-time. For example, an attempt, e.g., by a malicious entity, to configure an ECU connected to an in-vehicle network may be detected in real-time (e.g., by continuously monitoring messages sent over a network) and preventing a malicious or other entity from configuring, or otherwise interfere with an operations of components may be done in real-time, e.g., immediately upon receiving a message sent by an initiator to a target ECU.

Figure 4:
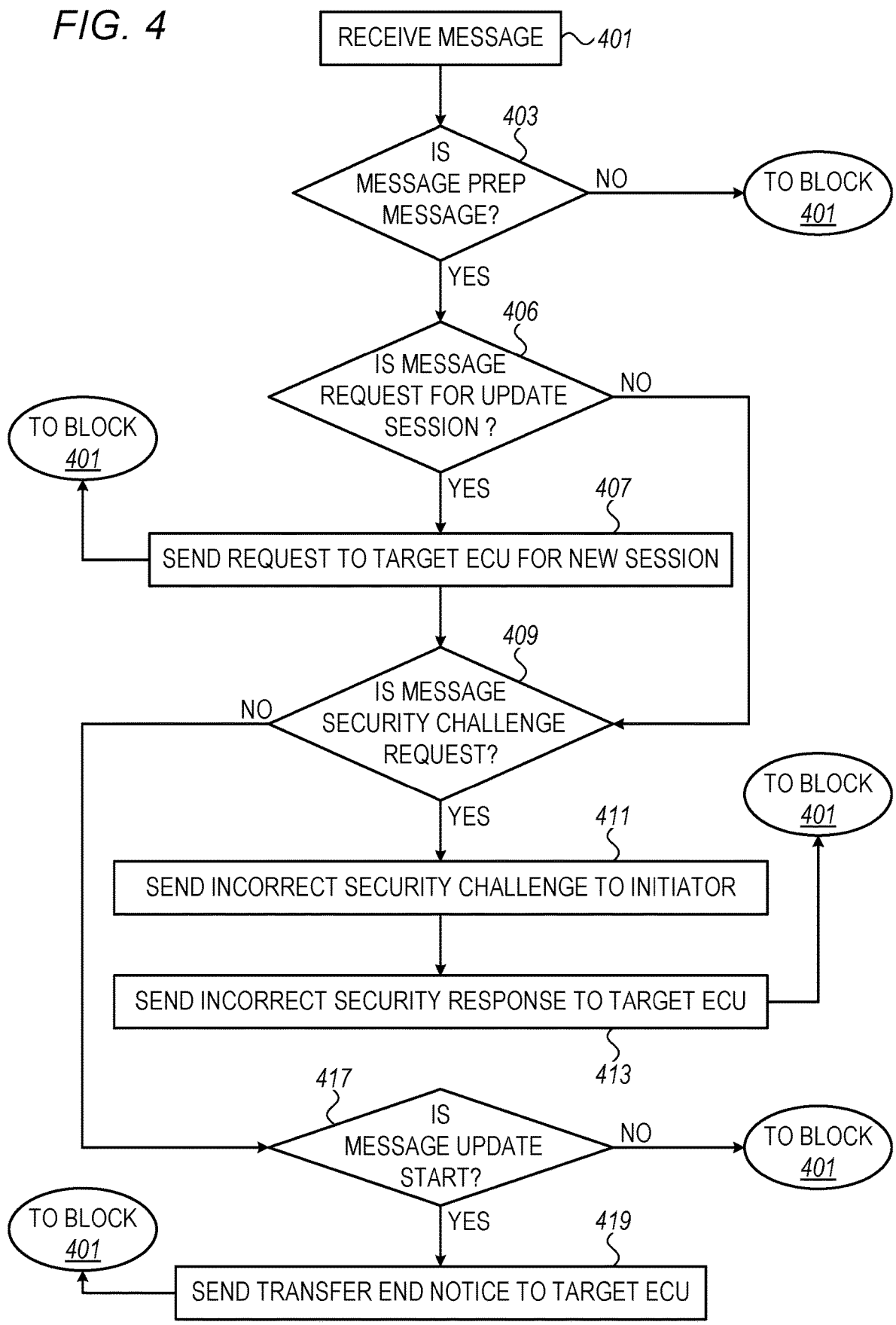
FIG. 4 shows a flowchart of a method according to illustrative embodiments of the present invention.

Reference is made to FIG. 4 that shows a flowchart of a method according to illustrative embodiments of the present invention. Generally, FIG. 4 schematically shows a flow diagram of logic or an algorithm that an SEU or other device may execute in response to a message that the SEU receives from an in-vehicle network or other network to which the SEU is connected. For example, the flowchart shown in FIG. 4 describes possible operations performed by an SEU when operating in protection mode as described herein.

As shown by block 401, a message may be received, e.g., an SEU may receive a message sent over CAN bus 61 or CAN bus 71 via port 42 as described, or another network. In some embodiments, when an SEU (e.g., SEU 40A) receives a CAN message propagated over CAN bus 61, processor 41 may access memory 45 in order to process the received message responsive to configuration data in memory 45 and/or an SEU may use logic or algorithms that may be included in memory 45 or in the SEU itself (e.g., in the form of executable code 125). For example, based on data in memory 45, an SEU may determine or select whether or not a disrupting message is to be transmitted by the SEU into the network, e.g., into CAN bus 61. For example, data in memory 45 may include data as shown by FIG. 3 and described herein.

In some embodiments, a received message may be processed based on the payload in, and based on metadata related to, the message. For example, metadata related to a message may be any data in a message that is other than a payload, for example, metadata as referred to herein may be, or may include one or more of the following: an ID of an intended recipient (e.g., an ID or other identifier of a target ECU) of the message included in the received message; an instruction included in the received message and any data included in the received message that may be associated with an instruction.

As shown by block 403, upon, at the time of or after receiving a message, an SEU may inspect the received message in order to determine the type of message received. For example, and as shown by block 403, an SEU may determine whether or not the received message is a prep message.

In some embodiments, an SEU may select whether or not to further process a message based on a stage of a session. For example, as shown by block 406, if a received message is a prep message, then the received message may be further inspected, e.g., by an SEU and in order to classify what stage of the transfer session is indicated by the received prep message. Inspecting a message, e.g., by an SEU and as shown by block 406 may include determining what disrupting message would be effective in disrupting the transfer session. For example, using data as shown in FIG. 3 and having determined the type of a message, an action (e.g., sending a specific message as indicated in table 300) may be selected. Of course and as described, other aspects related to the message may be considered, e.g., the stage or phase of a session, a context or state of the vehicle, the target ECU and so on.

As shown, if an SEU determines, e.g., based on the type of the message determined as shown by block 403, that no further action is required then the flow may be repeated, e.g., the flow may continue to block 401 to receive another message. For example, "no action" may be indicated in action column 330 of table 300 for a specific combination of a message type, a session stage, a target ECU and a context and, accordingly, an SEU may terminate processing of a received message and proceed to receive the next message that may be received via port 42 as described.

In some embodiments, a known protocol may be used in order to control communication of messages over a network. For example, the known in the art ISO 14229 standard may be used or adhered to by nodes in network 60. For the sake of clarity and simplicity, the ISO 14229 standard will mainly be referred to herein, however, it will be understood that any protocol may be used and that the scope of the invention is not limited by the specific protocol used. For example, using other protocols, messages types other than "diagnostic sessions" and "default diagnostic session" may be used, e.g., by configuring an SEU to support other message types.

Under the ISO 14229 standard, an initiator may request one of three types of "diagnostic sessions": a "default diagnostic session" for normal diagnostic operation for an ECU; a "programming session" for introducing a software update (by way of example a firmware update) to an ECU; and an "extended diagnostic session" for unlocking additional diagnostic functions. Embodiments of the invention may support any protocol or standard as described, including the ISO 14229 standard. For explanatory purpose and as an exemplary case, the ISO 14229 standard will be referred to herein, accordingly, monitoring and possibly disrupting a session or transfer session according to some embodiments of the invention are described herein with reference to the ISO 14229 standard. Other standards, protocols and data formats may be used.

If an SEU or other device determines that the received prep message indicates that session preparation is at a session request stage, e.g., if the prep message is a session request from the initiator as determined at block 406, then the SEU may transmit, as a disrupting message, a message ("new session request") requesting or causing the target ECU to initiate a new session as shown by block 407. According to the ISO 14229 standard, a "new session request" may cause the ECU receiving the message to abort the current transfer session in order to initiate the newly requested session. For example, the action column 330 may include, for a specific message, an action that includes sending a "new session request" message.

A prep message indicating a session request stage may, additionally or alternatively, include a response from the target ECU to the initiator's session request. For example, the new session request message may be a request for a new, lower privilege, session. In some cases, the new session request message may be for a default session that returns the target ECU to a default state for normal operations. In the exemplary case where a session is according to the ISO 14229 standard, the session request message from the initiator may correspond to a message comprising a target ECU's ID, a "DiagnosticSessionControl programmingSession" code, indication or instruction, and the new session request may correspond to a message requesting a default diagnostic session comprising the target ECU's ID and a "DiagnosticSessionControl defaultdiagnosticSession" code, indication or instruction, which takes, or moves, the target ECU out of the programming session and returns it to the default diagnostic session for normal operation.

In some embodiments, if an SEU determines that the received prep message indicates that session preparation is at a security access stage, e.g., if the prep message is a security challenge request from the initiator as shown by block 409, then the SEU may transmit a disrupting message that causes the initiator to fail in obtaining security access from the target ECU. A prep message indicating a security access stage may, additionally or alternatively, include a response from the target ECU to the initiator's security access request. A disrupting message sent by an SEU may be an incorrect security challenge sent to the initiator as shown by block 411, and/or an incorrect security response sent to the target ECU as shown by block 413.

Accordingly, e.g., in order to terminate a session or prevent, deny or disable access of an initiator to a target node, an embodiment may send a plurality of disrupting messages. For example, an SEU may send a first disrupting message to an initiator of a session and a second disrupting message to a target ECU.

In the exemplary case where control of the transfer session follows the ISO 14229 standard, a security challenge request message from an initiator may correspond to a message comprising a target ECU's ID, a "SecurityAccess" code, indication or instruction, and a seed request. In such scenario, an incorrect security challenge sent by an SEU (e.g., in order to disable or terminate a session) may correspond to a message comprising the initiator's ID and a "SecurityAccess" code, indication or instruction, and an incorrect seed. An incorrect security response sent by an SEU (e.g., in order to disrupt a session) may correspond to a message that includes the target ECU's ID and a "SecurityAccess" code, indication or instruction, and an incorrect key.

In some embodiments, if an SEU determines that the received prep message indicates that session preparation is at a pre-transfer stage, e.g., if the prep message is an "update start" message sent to the target ECU as shown by block 417, then the SEU may transmit, as a disrupting message, a message (e.g., an "exit transfer" message) prematurely requesting the target ECU to exit, terminate, or abort, the transfer session, by way of example, a message sent to the target ECU indicating that the transfer of the update data has been completed as shown by block 419.

A message causing the target ECU to exit, terminate, or abort, a transfer session may be received, by the target ECU, before the transfer of update data has begun, in which case the transfer may be aborted before ever taking place. Alternatively, the exit transfer message may be received, by the target ECU, after the transfer of update data has begun but not yet completed. A target ECU may include instructions useable for, or may be adapted to, identify an incomplete transferred update and, upon such identification, avoid applying any change based on data received. For example, a target ECU may be programmed or configured to determine that all data was received correctly before doing anything with received data, accordingly, if not all data for software or firmware update sent to a target ECU is properly received then the target ECU may ignore the received data. Accordingly, an SEU may prevent a (possibly malicious) initiator from updating software in a target ECU by sending a disrupting message after a session between the initiator and target ECU was established and, even after some data was already received, from the initiator, by the target ECU.

A prep message indicating a pre-transfer stage may, additionally or alternatively, include a response from a target ECU to the initiator's update start. Where control of the transfer session follows the ISO 14229 standard, the update start may correspond to a message that includes a target ECU's ID and a "RequestDownload" code, indication or instruction, and the request to exit transfer session may correspond to a message that includes the target ECU's ID and a "RequestTransferExit" code, indication or instruction.

While exemplary messages following, or according to, the ISO 14229 standard were provided herein, it will be appreciated that the process described herein may be applied to different standards, or variations of the ISO 14229 standard.

The security function provided by an SEU in accordance with embodiments of the invention may advantageously provide a security module that protects ECUs connected to an in-vehicle network from cyber-attacks, without requiring the security module be located on a gateway that filters out messages along the in-vehicle network. In some embodiments, an SEU may be located on a node and may "eavesdrop" on messages traversing a portion of the in-vehicle network to which the node is connected, for example a CAN bus. With such a configuration, an SEU may provide security functionality by transmitting disrupting messages into the in-vehicle network as needed, which is an action that does not require the SEU be located on a gateway. The security functionality provided by the SEU in accordance with an embodiment of the disclosure may be of particular use in a case where a malicious entity has taken over a node connected to a "clean" side of a CAN network (by way of example, clean CAN bus 61 as shown in FIG. 1B), where the malicious entity can transmit messages directly to other mission-critical ECUs without traversing a security-enabled gateway.

As described, a system (e.g., a computing device that includes at least a controller 105, a memory 120 and executable code 125) and/or method according to some embodiments may identify a message related to a data transfer from an initiator to a target node, e.g., an SEU may receive or identify a message related to a data transfer from an initiator to a target node sent over network that includes CAN bus 61 and/or CAN bus 71. For example, based on a standard or protocol known to an SEU, the SEU may identify or determine that a message it received was sent in order to prepare or cause a node on a network to receive a firmware update or a set of one or more configuration values that may change the operations or functions of the node, e.g., as known in the art. For example, a message received by an SEU may be included in a session (e.g., a session including an initiator and a target ECU) and, as described, a disruptive message sent by the SEU may terminate the session.

A protocol or standard may be known to an SEU, for example, using data (e.g., a file or other construct or object) that includes details and description of protocol messages. In other embodiments, logic included in an SEU (e.g., in executable code 125 that is executed by the SEU) may enable an SEU to determine the nature of messages, e.g., determine a messages requests to start a session, download data, terminate a session and the like.

In some embodiments, identifying a message related to a data transfer from an initiator to a target node may include identifying one of: a message sent by an initiator in order to prepare a target node to receive a data transfer and a message sent by the target node in reply to a message sent by the initiator. For example, a message sent by an initiator in order to prepare a target node to receive a data transfer may be a message according to a specific protocol (e.g., an ISO 14229 UDS message as known in the art) and, acquainted with the protocol as described, an SEU may identify the message, e.g., as a message that needs attention and may require sending a disruptive message. Similarly, a message sent by the target node in reply to a message sent by the initiator may be based on knowledge of a protocol that specifies specific replies to specific requests or messages, accordingly, a reply from a node may be a message identified by an SEU as one that merits attention and, possibly, sending a disruptive message as described. For example, a reply from a node may inform or indicate the node is ready for a data transfer, or may be a challenge, e.g., a part of an authentication or security procedure that may be performed prior a date transfer, configuration of a node, or a software update as known in the art. For example, in some protocols, a message sent by an initiator in order to prepare a target node to receive a data or configuration may be identified by a message type in a header of the message and a reply of the node may include the same type and a specific sub-type. As described, message types and sub-types may be known to an SEU that may, based on types and sub-types of messages, identify messages as described.

An embodiment may transmit, over a network, at least one disruptive message that causes a session or a data transfer to fail or not take place. For example, if an SEU determines that an unauthorized entity is attempting to download software or data to a node on a network as described or the SEU determines that downloading software or data to the node is unexpected or otherwise undesirable, then the SEU may transmit a message designed to terminate communication (e.g., a session) between the unauthorized entity and the node thus preventing the unauthorized entity from downloading data or software to the node.

Generally, a disruptive message may be any message that may disrupt a data exchange between a source and a destination (e.g., an initiator and target ECU as described herein) e.g., by closing or terminating a session. A disruptive message sent by an embodiment may fail a session, e.g., by notifying the parties of a session that the session has ended.

As described, an SEU may receive messages from any node in a vehicle, e.g., from engine control unit 62 and gearbox control unit 63 and, accordingly, an SEU may be aware of a state or context of the vehicle. In some embodiments, an SEU may determine that a message is unexpected or undesirable, and may send a disruptive message, based on a context or state. For example, a message intended to initiate (or maintain) an update session with gearbox control unit 63 while the vehicle is traveling at 65 mph (miles per hour) may be identified by an SEU as unexpected and/or undesirable and may cause the SEU to terminate the session or prevent the session from being properly established, e.g., by sending a disruptive message as described herein.

Accordingly, an SEU may select whether or not to send a disruptive message based on a context. For example, if the vehicle is in motion (a first state or context) then an SEU may select to disrupt a session and may select to send a disruptive message as described and, if a connection of a diagnostic system is identified, e.g., based on a message received as described (a second, different state or context) an SEU may select to refrain from, or avoid sending a disruptive message.

In some embodiments, an SEU may send more than one disruptive messages in order to disrupt a session or otherwise prevent an initiator from communicating with a target node. For example, in order to disrupt a session, an SEU may send a first disruptive message to an initiator and a second disruptive message to a target node. For example, an SEU may send a protocol message that terminates a session to the initiator and may send another protocol message that terminates a session to the target node.

In some embodiments, an SEU may select, and set, in a disruptive message, a source of a disruptive message based on a session. For example, to disrupt a session between an initiator and a target ECU, an SEU may send, to the initiator, a disruptive message that terminates the session and the SEU may, before sending the disruptive message, set the source of the message to be the target ECU such that the initiator is made to believe, or treat, the message was sent from the target ECU. Similarly, a message sent to a target node may be generated, by an SEU, such that it looks like (and consequently treated as) a message sent by an initiator of a session.

In some embodiments, an SEU may select the specific disruptive messages based on a specific protocol, e.g., based on the specific protocol used in a session. For example, a disruptive message selected may be a specific ISO 14229 UDS protocol message designed, or used, for terminating a session. An embodiment may select a disruptive message based on at least one of: the target node, a stage of a session and a type of the message received by an SEU. For example, a first disruptive message may be selected and sent by an SEU if a first target ECU is involved in a session and a second, different disruptive message may be selected and sent by the SEU if a second, different target ECU is involved in a session.

A disruptive message sent by an SEU to a node, e.g., to a target ECU, may cause the target node to perform any action or procedure, e.g., initialize or reset an interface, assume a specific operational mode, generate an alarm etc. For example, an SEU may be configured to send, to a target ECU, a disruptive message that modifies a state, configuration or an operational mode of the target ECU, e.g., a disruptive message that includes a specific instruction that causes a target ECU to reset itself (e.g., reboot as known in the art) and such reset may terminate a session.

Changing a state or operational mode of a node (e.g., by sending a disruptive message as described) may include configuring the node, including configuring any part, component or sub-system of a node, for example, a disruptive message sent by an SEU may include a configuration or instruction that causes a node to (possibly temporarily) disable its network interface thus terminating an ongoing session.

Since different ECUs may require or support different instructions or op-codes, a disruptive message selected and sent by an SEU may be based on the relevant ECU, e.g., based on the specific ECU participating in a session. Accordingly, a disruptive message may be selected and/or generated based on a node, e.g., based on a target ECU as described.

As described, a disruptive message may be selected based on a stage, state or phase of a session. For example, if based on a message an SEU determines that the session is not yet established or is in the process of being established (a first stage, state or phase of a session), e.g., a message received by an SEU is a request to establish a session, then the SEU may select a disruptive message that prevents an establishment of the session, e.g., an SEU may send a wrong reply (that is, wrong with respect to a protocol) or the SEU may send a reply that refuses to establish a session. In another case, e.g., if a session is already established (a second stage, state or phase of a session), an SEU may select a different disruptive message, e.g., a message that terminates a session or a message that resets or reboots a target node as described. An SEU may select a disruptive message based on a message received by the SEU. For example, an SEU may identify a protocol according to which a message it received is generated and sent and, based on the identified protocol, the SEU may generate and send a disruptive message.

An SEU may select whether or not to send a disruptive message based on an operational mode of the SEU. For example, when operating in a protective mode, an SEU may send disruptive messages as described, however, when in passive operational mode, an SEU may monitor traffic on the network, record events, generate alerts and the like but may refrain from, or avoid, sending disruptive messages.

As described, an SEU may automatically and/or autonomously select an operational mode, e.g., one of a protective and passive modes described herein, as further described, an SEU may selectively send disruptive messages. For example, an SEU may select whether or not to send a disruptive message based in its operational mode, e.g., an SEU may send disruptive messages only if it is in protective mode. An SEU may be embedded in a node on a network, e.g., as shown by SEU 40C that may be embedded in CAN gateway 80. An SEU may protect an entire network as described or it may protect a single device. For example, an embedded SEU may protect the device or node it is embedded in, e.g., disrupt sessions involving the embedding device. In some embodiments, an SEU may be embedded in strategic nodes, for example, embedding an SEU in CAN gateway 80 enables an embodiment to protect a sensitive portion of a network (e.g., bus 61) from security threats that may originate at a low security network (e.g., bus 71).

Descriptions of embodiments of the invention in the present application are provided by way of example and are not intended to limit the scope of the invention. The described embodiments include different features, not all of which are required in all embodiments. Some embodiments utilize only some of the features or possible combinations of the features. Variations of embodiments of the invention that are described, and embodiments comprising different combinations of features noted in the described embodiments, will occur to persons of the art. The scope of the invention is limited only by the claims.

Unless explicitly stated, the method embodiments described herein are not constrained to a particular order in time or chronological sequence. Additionally, some of the described method elements may be skipped, or they may be repeated, during a sequence of operations of a method.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

Various embodiments have been presented. Each of these embodiments may of course include features from other embodiments presented, and embodiments not specifically described may include various features described herein.

The invention claimed is:

1. A system for providing cyber security to an in-vehicle communication network comprising:
a vehicle including:
a memory; and
a controller included in a security enforcement unit, the controller configured to:
determine that a message sent from an initiator to a target node, jeopardizes the security of the in-vehicle communication network, wherein the message is related to a data transfer which is related to a diagnostic session and wherein at least one of: the initiator and the target node is connected to the in-vehicle network;
generate a disruptive message designed to terminate or prevent transfer of data over the session; and
send, to at least one of the initiator and the target node, over the in-vehicle communication network, the disruptive message, wherein when sent, the disruptive message prevents the initiator from transferring data to the target node by at least one of:
causing at least one of the initiator and the target node to terminate the session, and
preventing at least one message sent from the initiator from reaching the target node.

2. The system of claim 1, wherein the identified message is one of: a message sent by the initiator in order to prepare the target node to receive the data transfer and a message sent by the target node in reply to a message sent by the initiator.

3. The system of claim 1, wherein the disruptive message modifies a state of a node.

4. The system of claim 1, wherein the controller is further configured to select an operational mode and selectively send disruptive messages based on the selected operational mode.

5. The system of claim 1, wherein the controller is further configured to select whether or not to send the disruptive message based on a context.

6. The system of claim 1, wherein the controller is further configured to send a first disruptive message to the initiator and a second disruptive message to the target node.

7. The system of claim 1, wherein the controller and memory are embedded in a node that is adapted to control at least one system in the vehicle.

8. The system of claim 1, wherein the controller is further configured to select the disruptive message according to a predefined protocol.

9. The system of claim 1, wherein the controller is further configured to select the disruptive message based on at least one of: a state of the vehicle, a context, a message received by the controller, the target node and a stage of a session.

10. The system of claim 1, wherein the controller is further configured to send disruptive messages when in a protective operational mode and monitor traffic on the network when in a passive operational mode.

11. A method for providing cyber security to an in-vehicle network in a vehicle, the method comprising:
determining, by a controller, that a message sent from an initiator to a target node, jeopardizes the security of the in-vehicle network, wherein the message is related to a data transfer which is related to a diagnostic session and wherein at least one of: the initiator and the target node is connected to the in-vehicle network;

generating a disruptive message designed to terminate or prevent transfer of data over the session; and sending, to at least one of the initiator and the target node, by the controller, over the in-vehicle network, the disruptive message, wherein when sent, the disruptive message prevents the initiator from transferring data to the target node by at least one of:

causing at least one of the initiator and the target node to terminate the session, and preventing at least one message sent from the initiator from reaching the target node.

12. The method of claim 11, wherein the identified message is one of: a message sent by the initiator in order to prepare the target node to receive the data transfer and a message sent by the target node in reply to a message sent by the initiator.

13. The method of claim 11, wherein the disruptive message modifies a state of a node.

14. The method of claim 11, comprising selecting whether or not to send the disruptive message based on a context.

15. The method of claim 11, comprising sending a first disruptive message to the initiator and a second disruptive message to the target node.

16. The method of claim 11, wherein the controller is embedded in a node that is adapted to control at least one system in the vehicle.

17. The method of claim 11, comprising selecting the disruptive message according to a predefined protocol.

18. The method of claim 11, comprising selecting the disruptive message based on at least one of: a state of the vehicle, a context, a message received by the controller, the target node and a stage of a session.

19. The method of claim 11, comprising selecting the disruptive message based on one of: a context, a message received by the controller, the target node and a stage of a session.

* * * * *